May 5, 1936.　　　　M. WAGNER　　　　2,039,670
SPRINGING ARRANGEMENT FOR THE WHEELS OF VEHICLES
Filed Dec. 27, 1933　　　2 Sheets-Sheet 1

Inventor
Max Wagner

May 5, 1936.  M. WAGNER  2,039,670
SPRINGING ARRANGEMENT FOR THE WHEELS OF VEHICLES
Filed Dec. 27, 1933    2 Sheets-Sheet 2
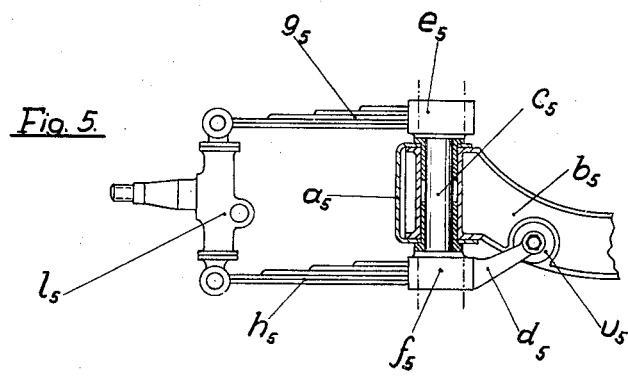
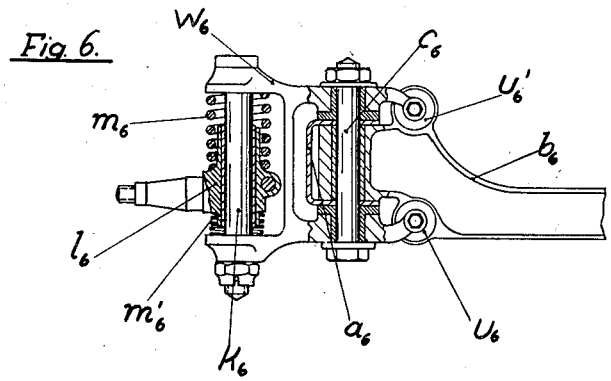
Inventor.
M. Wagner
By: Glascock Downing Seebold
Attys.

Patented May 5, 1936

2,039,670

UNITED STATES PATENT OFFICE 2,039,670

SPRINGING ARRANGEMENT FOR THE WHEELS OF VEHICLES

Max Wagner, Stuttgart, Germany, assignor to Daimler-Benz Aktiengesellschaft, Stuttgart-Unterturkheim, Germany, a company of Germany Application December 27, 1933, Serial No. 704,179
In Germany December 14, 1932

27 Claims. (Cl. 267—20)

This invention relates to an arrangement of springing independently sprung wheels, more particularly those of motor vehicles, by means of guiding elements which swing about a longitudinal and a transverse axis, such as links, half axles, leaf springs or the like, and consists substantially in this, that the guiding elements are flexibly connected to the upper part of the chassis, for instance the frame, in such a manner that they can at the same time yield somewhat in a horizontal plane.

Suitably, the elements are made capable of yielding by the guiding elements for instance being journalled by means of a vertical pin on the upper part of the chassis and bearing by means of arms against rubber buffers or the like.

This yielding capability of the guiding elements in a horizontal direction, that is to say more particularly in a direction perpendicular to the plane in which the wheels swing, has the advantage that the jolts affecting the wheels in this direction (in the case of transversely swinging axles for instance in the direction of travel and in the case of longitudinally swinging levers or the like in the transverse direction) are absorbed before being transmitted to the body, the vehicle travels more smoothly and the axles and axle parts are more protected. At the same time the wobbling of the front wheels, which in certain circumstances occurs even with independently sprung wheels, may be eliminated. The provision of a vertical pivot pin results, among other advantages, in spite of the yielding construction in a satisfactory, secure journalling of the guiding elements and in the advantage that the rubber buffers, when suitably arranged, are stressed only in compression or tension.

The invention also relates to a particularly suitable arrangement of the suspension and springing of the wheels or of the guiding elements.

Figure 1:
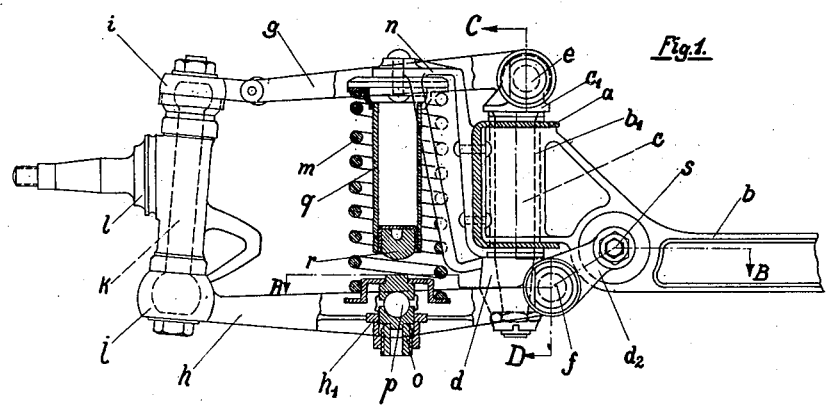
Figure 2:
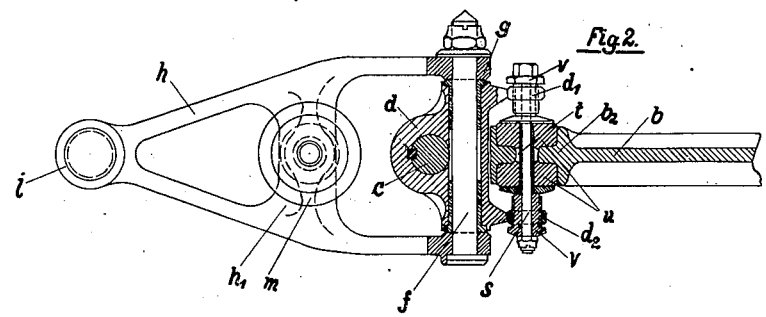
Figure 4:
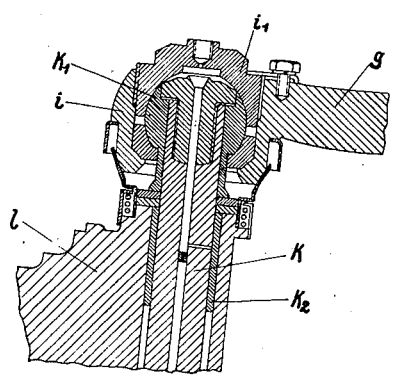
Figure 3:
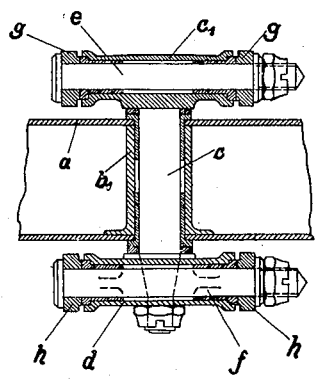

In the accompanying drawings a constructional example of the invention is illustrated, in which the wheels are connected by two link members swinging in a transverse plane of the vehicle to the upper part of the chassis and are guided by the said links substantially in the manner of a parallelogram. In these drawings Fig. 1 is a view of this arrangement from the front, Fig. 2 a view from above, being a section on line A—B of Fig. 1, Fig. 3 a section on line C—D of Fig. 1 and Fig. 4 a section through the upper steering swivel joint, Fig. 5 is a view of a modification in which the wheel is supported by leaf springs and Fig. 6 is a section through a further modification having vertical cylindrical guiding means for the wheel and a guide member interposed between the wheel carrier and the frame.

$a$ is a longitudinal frame member, $b$ a transverse member which connects it with the opposite longitudinal member and in the end bearing $b_1$ of which a vertical pin $c$ is rotatably journalled. The latter is given a T-like shape by an upper cross-piece $c_1$ and, by a further cross-piece $d$ which is rigidly fixed to it by means of a cone and cotter acquires the form of an I. The two cross-pieces are constructed so as to form bearings for the two horizontal pins $e$ and $f$ which lie more or less outside the axis of the vertical pin and which themselves act as pivot pins for the two fork-shaped, substantially triangular link members $g$ and $h$. The stub axle or wheel carrier $l$ is connected by means of the steering swivel pin $k$ with ball and socket joints $i$ and $j$, so that it is guided by the links in a parallelogram-like manner. As will be seen from Fig. 4, the steering swivel pin $k$ is rotatably journalled both in the two joints $i$ and $j$ by the upper joint ball $k_1$ which is screwed to it and a corresponding ball which may for instance be integral with the pin and in the steering swivel itself by means of the bearings $k_2$. This freely rotatable mounting both in the ball joints and in the steering swivel has the advantage that should the ball and socket joints become jammed, for instance by the nuts $i_1$ being too much tightened, or through dirt or the like entering, the steering swivel $l$ will still be capable of turning easily about the bearings $k_2$ and the steering of the wheels will thus not be detrimentally affected. The wheel is mounted on the steering swivel $l$ in the usual way.

For springing the wheels a helical spring $m$ is provided, the convolutions of which are unguided and which bears at one end against a bracket $n$ fixed to the longitudinal frame member $a$ and at the other end against a ball and socket joint $p$ which is provided on the cross-bar $h_1$ of the link $h$ and is adjustable by means of a nut $o$. The spring may be rigidly clamped at one end, for instance its upper end, or at both ends to its spring supports or may simply bear against the latter under the spring pressure. In order to prevent the wheel springing too far and for acting as a safety means in case of the helical spring breaking, a stop member $r$ is provided within the spring on a tubular projection $q$, which stop member is preferably in the form of a rubber buffer and bears against the ball bearing $p$ after the wheel has yielded a certain distance. The spring is preferably placed in the space between the two arms of the links, so that the arrangement is convenient without taking up too much space. Two or more springs could of course also be provided for each wheel.

Furthermore in accordance with the invention the lower cross-piece $d$ is provided with arms $d_1$ and $d_2$ which engage on either side of the transverse member $b$ of the frame. These arms are connected to one another by a bolt $s$, which extends through a bore $t$ of an eye $b_2$ of the transverse member $b$, which is recessed on either side. In the recesses of the eye rubber buffers $u$ are inserted which embrace the bolt $s$ and are put under compression by washers and nuts $v$.

The manner in which this arrangement operates is obvious. On jolts in the vertical direction occurring, the stub shaft is guided in a known manner in the vertical plane by the two links $g$, $h$, of equal or unequal length, the trapezium or parallelogram-like link quadrilateral $e$—$i$—$j$—$f$ ensuring an approximately parallel motion of the wheel. The whole link quadrilateral can, however, itself turn about the vertical pin $c$ but only as far as the elasticity of the rubber buffers $u$ will permit. On jolts in the direction of travel striking the wheel, the link quadrilateral can thus yield elastically in the direction of travel, so that protection is provided for the vehicle parts in question and smoother and pleasanter driving is secured.

In the modification shown in Fig. 5, the wheel carrier $l_5$ is supported by means of superposed transverse leaf spring $g_5$ and $h_5$ which are rigidly clamped to the vertical pin $c_5$ by means of two spring housings $e_5$ and $f_5$. Rotary movement of the pin $c_5$ together with the transverse springs and the wheel is limited by means of the arm $d_5$ to such an extent as permitted by the rubber buffer $u_5$ arranged on the transverse member $b_5$ of the frame.

In the modification shown in Fig. 6, the wheel carrier $l_6$ is mounted on a swivel pin $k_6$ so as to be slidable vertically against the action of the springs $m_6$ and $m'_6$. The swivel pin itself is rotatably mounted or fixed at its ends in a forked guiding part $w_6$ which can swing about a vertical pivot pin $c_6$, the swinging movement being limited by the rubber buffers $u_6$ and $u'_6$.

The wheels may in all cases be driven or not driven.

What I claim is:

1. In a power-driven vehicle, a frame, a vehicle wheel, a guiding element for the wheel for connecting the wheel with the frame in such a manner that the wheel can move in a vertical plane relative to the frame, pivotal means for connecting the guiding element with the frame in such a manner that it can turn about a vertical axis on the frame and elastic means for supporting the guiding element in such a manner that it can only swing to a small extent about the vertical axis against the elastic means.

2. In a power-driven vehicle, a frame, a vehicle wheel, a guiding element for the wheel for connecting the wheel with the frame in such a manner that it can swing relative to the frame together with the guiding element in a vertical transverse plane of the vehicle, pivotal means for connecting the guiding element with the frame in such a manner that the guiding element can swing about a vertical axis on the frame in the direction of travel and elastic means for supporting the guiding element in such a manner that it can only swing to a small extent about the vertical axis against the elastic means.

3. In a power-driven vehicle, a frame, a vehicle wheel, a guiding element for the wheel for connecting the wheel with the frame in such a manner that the wheel can swing in a vertical plane relative to the frame, a pin for pivotally connecting the guiding element with the frame having a substantially vertical axis in such a manner that the guiding element can turn about the vertical axis of the pin and elastic buffers for allowing the guiding element only a small rotary movement about the pin against the elasticity of the buffers.

4. In a power-driven vehicle, a frame, a vehicle wheel, a guiding element for the wheel for connecting the wheel with the frame in such a manner that the wheel can swing in a vertical plane relative to the frame, a pin mounted substantially vertically on the frame for pivotally connecting the guiding element with the frame in such a manner that the pin together with the guiding element can swing about the vertical axis, arms non-rotatably connected with the pin, and elastic buffers against which the arms bear for allowing the pin to swing about its axis only against the elasticity of the buffers.

5. In a power-driven vehicle, a frame, a vehicle wheel, a wheel carrier, a pin mounted on the frame so as to be rotatable about a substantially vertical axis, two guiding elements connected at one end with the pin and at the other end with the wheel carrier in such a manner that the wheel carrier can swing relative to the frame in a vertical plane, arms non-rotatably connected with the pin, and elastic buffers against which the arms bear for allowing the pin to swing about its axis only against the elasticity of the buffers.

6. In a power-driven vehicle, a frame, a vehicle wheel, a wheel carrier, a pin mounted on the frame so as to be rotatable about a substantially vertical axis, two link members arranged substantially one above the other, pivotally connected at one end with the pin and at the other end with the wheel carrier with horizontal pivotal axis, arms non-rotatably connected with the pin and elastic buffers against which the arms bear for allowing the pin to swing about its axis only against the elasticity of the buffers.

7. In a power-driven vehicle, a frame, a vehicle wheel, a wheel carrier, a pin mounted on the frame so as to be rotatable about a substantially vertical axis, a transverse member at the upper end of the pivot pin, a further transverse member at the lower end of the pivot pin, a fork-like upper link member, a horizontal pin by means of which the fork ends of the link member are pivotally mounted at both sides on the upper transverse member of the pivot pin, a joint for connecting the end of the link member opposite to the fork ends with the wheel carrier, a fork-like lower link member, a further horizontal pin by means of which the fork ends of the lower link member are pivotally mounted at both sides on the lower transverse member of the pivot pin, a joint for connecting the end of the lower link member opposite to the fork ends with the wheel carrier, elastic means which allow a rotation of the pivot pin around its vertical axis through only a small angle against the action of the elastic means.

8. In a power-driven vehicle, a frame, a vehicle wheel, a wheel carrier, a link pin rotatably mounted in the wheel carrier, a pivot pin rotatably mounted on the frame with its axis of rotation substantially perpendicular, elastic means for elastically supporting the pivot pin against rotation about its axis, an upper link member, a lower link member, a joint for each link member for connecting it at one end with the pivot pin so as to be swingable about a horizontal axis and a ball joint for each link member for connecting the other end of the link member with the link pin so as to be capable of swinging in all directions.

9. In a power-driven vehicle, a frame, a vehicle wheel, a guiding element for the wheel for connecting the wheel with the frame in such a manner that the wheel can swing in a vertical plane relative to the frame, a pin for pivotally connecting the guiding element with the frame having a substantially vertical axis, in such a manner that the guiding element can turn about the vertical axis of the pin, two fork-like arms connected with the pin and elastic buffers arranged between the arms, against which the arms bear from opposite sides.

10. In a power-driven vehicle, a frame, a vehicle wheel, a guiding element for the wheel for connecting the wheel with the frame in such a manner that the wheel can swing in a vertical plane relative to the frame, a pin for pivotally connecting the guiding element with the frame having a substantially vertical axis, in such a manner that the guiding element can turn about the vertical axis of the pin, arms connected with the pin, elastic buffers and adjustable stops on the arms by means of which the arms bear against the buffers and by means of which the buffers can be initially tensioned.

11. In a power-driven vehicle, a frame, a vehicle wheel, a guiding element for the wheel for connecting the wheel with the frame in such a manner that the wheel can swing in a vertical plane relative to the frame, a pin for pivotally connecting the guiding element with the frame having a substantially vertical axis, in such a manner that the guiding element can turn about the vertical axis of the pin, two fork-like arms connected with the pin, elastic buffers arranged between the arms, which bear against the frame, a bolt passing through the buffers on the arms, stops on the bolt and a nut which adjusts the stops on the bolt from the opposite side against the rubber buffers and secures them against displacement relative to the arms.

12. In a power-driven vehicle, a frame, a vehicle wheel, a guiding element for the wheel for connecting the wheel with the frame in such a manner that the wheel can swing in a vertical plane relative to the frame, pivotal means for connecting the guiding element with the frame in such a manner that it can turn about a vertical axis on the frame, elastic means for supporting the guiding element in such a manner that it can only swing to a small extent about the vertical axis and a helical spring which bears with one end against the frame and with the other end against the guiding element for resiliently supporting the wheel when swinging in the vertical plane.

13. In a power-driven vehicle, a frame, a vehicle wheel, a wheel carrier, a pivot pin mounted vertically on the frame, elastic means which allow the pivot pin to turn about its axis only through a small angle against their elasticity, two fork-like link members arranged one above the other, joints for connecting the fork ends of the link members with the pivot pin, further joints for connecting the other ends of the link members with the wheel carrier in such a manner that the link member with the wheel carrier can swing in a vertical plane about the first-mentioned joints, a substantially unguided helical spring which is arranged substantially between the two link members and between the fork-like arms of the link members and which bears with one end against the frame and with the other end against one of the link members.

14. In a power driven vehicle, a frame, a vehicle wheel, an axle member for the wheel for connecting the wheel with the frame in such a manner that the wheel can move up and down independently relatively to the frame, pivotal means for connecting the axle member to the frame in such a manner that it can swing about a substantially vertical axis on the frame, arms mounted for turning with the axle member about said vertical axis and elastic buffers against which the arms bear for allowing said axle member to swing together with the arms only to a small extent about the vertical axis against said buffers.

15. In a power driven vehicle, a frame, a vehicle wheel, a wheel carrier, a pivot pin mounted on the frame so as to be rotatable about a substantially vertical axis, two links pivotally connected one above the other at one end to said pin so as to be capable of swinging in a vertical plane relatively to the frame, pivotal means for connecting the other ends of the links to the wheel carrier so that the wheel can swing in said vertical plane relatively to the frame, a substantially unguided helical spring arranged with one end bearing against the frame and the other end bearing against one of the links and elastic means which allow the pivot pin to turn around its vertical axis through only a small angle against the action of the elastic means.

16. In a power driven vehicle, a frame, a vehicle wheel, a wheel carrier, a pivot pin mounted on the frame so as to be rotatable about a substantially vertical axis, two links pivotally connected one above the other at one end to said pin so as to be capable of swinging in a vertical plane relatively to the frame, pivotal means for connecting the other ends of the links to the wheel carrier so that the wheel can swing in said vertical plane relatively to the frame, a spring abutment, a ball joint connecting said spring abutment with one of the links so as to enable said abutment to move freely in all directions, a substantially unguided helical spring arranged with one end bearing against the frame and the other end against said spring abutment and elastic means which allow the pivot pin to turn around its vertical axis through only a small angle against the action of the elastic means.

17. In a power driven vehicle, a frame comprising a longitudinal frame member and a transverse frame member connected thereto, a vehicle wheel, a wheel carrier, two link members for connecting the wheel carrier to the frame, one of said link members hinged at one end to the frame immediately above and the other immediately below the longitudinal frame member at the point of connection of the transverse frame member to the longitudinal frame member, a spring bracket secured to the frame at the said point of connection and a spring for springing the wheel with respect to the frame and arranged to bear at one end against one of said link members and at the other end against the spring bracket, whereby the bearing reaction forces of the link members and the spring pressure applied to the spring bracket are transmitted to the frame directly at the said point of connection substantially without subjecting the longitudinal or transverse frame member to additional bending action.

18. In a power driven vehicle, the combination of a longitudinal frame member with a wheel carrier, a pivot pin rotatably mounted on the frame so as to intersect the said frame member substantially vertically and to be turning about a substantially vertical axis, two link members for connecting the wheel carrier to the frame, one of said link members pivotally connected to the pivot pin above and the other below the longitudinal frame member, so that the link members together with the wheel carrier can swing in a vertical plane.

19. In a power driven vehicle, the combination as set forth in claim 18 with a transverse frame member connected to the longitudinal frame member in proximity to the pivot pin so that the pivot pin also intersects the transverse frame member substantially vertically.

20. In a power driven vehicle, a frame comprising a longitudinal frame member and a transverse frame member connected thereto, a vehicle wheel, a wheel carrier, a pivot pin rotatably mounted on the longitudinal frame member with its axis of rotation substantially vertical, at the point of connection of the transverse frame member to the longitudinal frame member, swinging guiding means for connecting the wheel carrier to the frame, said guiding means mounted on the pivot pin so as to be capable of turning relatively to the frame around the pivot pin and of swinging in a vertical plane relatively thereto, a lever arm connected to said guiding means so as to be rotatable around the pivot pin together with the guiding means and an elastic buffer on the transverse frame member against which the lever arm bears, so that the guiding means can swing about the pivot pin only to a limited extent against the action of the elastic buffer.

21. In a power driven vehicle, the combination as set forth in claim 20, in which the lever arm is forked and the forked ends straddle the transverse frame member, and comprising a rubber buffer on each side of the transverse frame member against which buffers the forked ends bear.

22. In a power driven vehicle, the combination as set forth in claim 18 with a transverse frame member connected to the longitudinal frame member at the point at which the pivot pin is mounted, a spring bracket secured to the longitudinal frame member at the point of connection of the transverse frame member with the longitudinal frame member and a spring for springing the wheel carrier with respect to the frame arranged to bear at one end against the spring bracket.

23. In a power driven vehicle, the combination as set forth in claim 1, with yielding suspension means for springing the wheel with respect to the frame in the vertical direction.

24. In a power driven vehicle, a frame comprising a longitudinal frame member and a transverse frame member connected thereto, a vehicle wheel, a wheel carrier, two link members for connecting the wheel carrier to the frame, supporting means for said link members on the frame located at the point of connection of the longitudinal and transverse frame members, said link members pivotally connected to said supporting means in superposed relationship, one above and the other below the said frame members, so as to swing in a transverse plane about axes extending substantially in the longitudinal direction of the vehicle, a spring bracket secured to the frame, at the point of connection of the longitudinal and transverse frame members, on the outside of the transverse frame member and a substantially unguided helical compression spring bearing at its upper end against the spring bracket and at its lower end against one of said link members.

25. In a power driven vehicle, a frame, a vehicle wheel, a wheel carrier, two link members for connecting the wheel carrier to the frame, supporting means on the frame for said link members, said link members pivotally connected to said supporting means in superposed relationship so as to swing in a vertical transverse plane and being capable of displacement in the horizontal direction with respect to the frame, yielding abutment means on the frame for limiting the said displacement and an unguided helical spring bearing at one end against the frame and at the other end against one of the link members, for resiliently supporting the link members in the vertical direction.

26. In a power driven vehicle, the combination as set forth in claim 25 with a transverse frame member connected to the longitudinal frame member substantially at the point of location of the supporting means for the link members and a spring abutment on the frame at the point of connection of the transverse and longitudinal frame members.

27. In a power driven vehicle, a frame, a vehicle wheel, a wheel carrier, an intermediate piece mounted on the frame so as to be rotatable about a substantially vertical axis, two guiding elements connected at one end with the intermediate piece and at the other end with the wheel carrier so that the wheel carrier can swing relatively to the frame in a vertical plane, and elastic means for resisting turning of the intermediate piece together with the two guiding elements as a unit about the said vertical axis.

MAX WAGNER.